US012133052B2

(12) United States Patent
Berbouchi et al.

(10) Patent No.: US 12,133,052 B2
(45) Date of Patent: Oct. 29, 2024

(54) BONE ANCHORED HEARING IMPLANT DEVICE, HEARING DEVICE SYSTEM AND SIGNAL PROCESSING METHOD

(71) Applicant: Oticon Medical A/S, Smørum (DK)

(72) Inventors: Taoufik Berbouchi, Vallauris (FR); Yannick Vaiarello, Vallauris (FR)

(73) Assignee: Oticon Medical A/S, Smørum (DK)

( * ) Notice: Subject to any disclaimer, the term of this patent is extended or adjusted under 35 U.S.C. 154(b) by 193 days.

(21) Appl. No.: 17/970,686

(22) Filed: Oct. 21, 2022

(65) Prior Publication Data

US 2023/0125303 A1 Apr. 27, 2023

(30) Foreign Application Priority Data

Oct. 22, 2021 (EP) .................................... 21204113

(51) Int. Cl.
*H04R 25/00* (2006.01)

(52) U.S. Cl.
CPC ........... *H04R 25/554* (2013.01); *H04R 25/65* (2013.01); *H04R 2460/13* (2013.01)

(58) Field of Classification Search
CPC ... H04R 2460/13; H04R 25/554; H04R 25/65
See application file for complete search history.

(56) References Cited

U.S. PATENT DOCUMENTS

2018/0103330 A1* 4/2018 Balslev ................ H04R 25/305

OTHER PUBLICATIONS

Anonymous: “Power Supply Design Notes: Zener Diode Voltage Regulator”, Power Electronics News, Jul. 11, 2020, XP055909655, pp. 1-9.
Anonymous: “Understanding a regulator circuit with MOSFET and Zener-Diode”, Electronics Forums Reply to Thread Search Forums Recent Posts, Sep. 30, 2017, XP055909649, pp. 1-6.
European Search Report issued in priority application No. 21204113.1, dated Apr. 20, 2022.

* cited by examiner

*Primary Examiner* — Mark Fischer
(74) *Attorney, Agent, or Firm* — Birch, Stewart, Kolasch & Birch, LLP

(57) ABSTRACT

A bone anchored hearing implant device for enhancing the hearing capability of a user is disclosed. The device includes at least one antenna element for receiving signals provided by an external device, in particular by at least one external hearing device, at least one modulation device for demodulating the signals received by the antenna element, at least one transducer, in particular for generating vibrations depending on the demodulated signals, at least one connection circuit for transferring the demodulated signals to the transducer, at least one protection circuit for at least partly short-circuiting the connection circuit, wherein the short-circuit at least partly prevents a transfer of the demodulated signals to the transducer. Additionally a hearing device system and a signal processing method are disclosed.

20 Claims, 3 Drawing Sheets

BONE ANCHORED HEARING IMPLANT DEVICE, HEARING DEVICE SYSTEM AND SIGNAL PROCESSING METHOD

FIELD

The present disclosure relates to a bone anchored hearing implant device for enhancing the hearing capability of a user. More particularly, the disclosure relates to said bone anchored hearing implant device, the bone anchored hearing implant device comprising at least one antenna element for receiving signals provided by an external device, in particular by at least one external hearing device, at least one modulation device comprising a demodulation circuitry for demodulating the signals received by the antenna element, at least one transducer for generating vibrations depending on the demodulated signals, and at least one connection circuit for transferring the signals received by the antenna element to the at least one modulation device and for transferring the demodulated signals to the transducer. The present disclosure further relates to a hearing device system comprising at least one aforementioned bone anchored hearing implant device and at least one external hearing device for supplying the antenna element with signals. Additionally, the present disclosure relates to a signal processing method for protecting the user of a bone anchored hearing implant device from overstimulation, the method comprising: receiving signals from an external device, demodulating the received signals, and transferring the demodulated signals to a transducer.

BACKGROUND

Bone anchored hearing implant devices for enhancing the hearing capability of a user usually are built as passive implant which means that such implants do not rely on a power supply in order to supply the electronic of the implant with electricity. The electronic inside the implant thus usually works without an external power supply being connected to the implant.

Since such bone anchored hearing implant devices typically are passive, users of these bone anchored hearing implant devices have to be protected from excessive external electromagnetic fields. Excessive external electromagnetic fields could cause the transducer of the bone anchored hearing device to produce an extensive output force and hereby damage the cochlea of the user through indirectly simulating a high sound level. This for example may be caused via a missfunction of an external hearing device which supplies the antenna elements with false signals. This may also be caused via a different external device which transmit signals which may be received by the at least one antenna element.

Circuits of bone anchored hearing implant devices are known which limit the output force. For this purpose, it is known to supply a connection circuit with several diodes in order to prevent the transducer of the bone anchored hearing implant device to produce extensive output forces and therefore protect the user of the bone anchored hearing implant device from overstimulation.

Such a solution depending solely on diodes is disadvantageous since a high voltage threshold, above which the signals received by the antenna element do not cause a high output force, may only be provided by arranging several diodes in series. The several diodes in series usually do not provide a stable voltage threshold since the voltage threshold supplied by the diodes is dependent on the current driven by the diodes. This may lead to a reduced output force below said voltage threshold and thus to an undesirable reduction of the output force. Therefore, the performance of the bone anchored hearing implant device, even when the hearing implant device is normally used, may be undesirably reduced.

Therefore, there is a need to provide a solution that addresses at least some of the above-mentioned problems.

SUMMARY

According to an aspect the bone anchored hearing implant device may comprise at least one antenna element for receiving signals provided by an external device, in particular by at least one external hearing device. The at least one antenna element may be configured to receive and/or transmit electromagnetic radio-frequency signals.

The bone anchored hearing implant device may further comprise at least one modulation device comprising a demodulation circuitry for demodulating the signals received by the antenna element. Via the at least one modulation device the signals received by the antenna element may be demodulated in order to provide demodulated signals which represent an audio signal and/or a control signal e.g. for setting an operational parameter (e.g. volume) and/or a processing parameter of the bone anchored hearing implant device.

The at least one modulation device may cause demodulated signals, in particular demodulated carrier signals with carrier frequencies depending on the signals received by and/or delivered by the at least one antenna element. The modulation device may comprise a demodulation circuitry. The demodulation circuitry may in particular demodulate the signals received by and/or delivered by the at least one antenna element via amplitude demodulation.

The demodulated signals may comprise a carrier voltage, in particular an alternating current carrier voltage. Said carrier voltage, in particular said alternating carrier voltage, may cause the at least one transducer to generate vibrations. A higher peak voltage of a demodulated signal, in particular of a demodulated alternating current signal, may for example cause a higher force output of the at least one transducer.

The demodulation circuitry may comprise at least one diode, in particular at least one rectifier diode and/or at least one demodulation capacitor.

The demodulation capacitor may influence the power consumption of the bone anchored hearing device, the bandwidth of the signals, in particular of the demodulated signals and/or the total harmonic distortion of the bone anchored hearing implant device. A value, in particular a capacity, of the demodulation capacitor may be determined as a trade-off between said parameters of the bone anchored hearing device. For example a high value, in particular a high capacity, of the demodulation capacitor may cause a low total harmonic distortion of the bone anchored hearing implant device, but may cause an increase in power consumption. Additionally, the value, in particular the capacity, of the demodulation capacitor may be determined based on a skin thickness measure. In particular, the value of the capacitor may be determined to suit a skin thickness between 3 mm and 9 mm. The demodulation capacitor may comprise a value, in particular a capacity between 20 nF and 80 nF, in particular between 35 nF and 65 nF, especially preferred between 45 nF and 50 nF. Said capacity of the demodulation capacitor may enable a beneficial trade-off between said parameters and also provides a capacitor which is suited for a skin thickness of a user between 3 mm and 9 mm.

The diode may comprise a maximum forward current between 100 mA and 600 mA, in particular between 400 mA and 500 mA. The diode may comprise a maximum instantaneous reverse voltage of 50 V, in particular of 40 V. The diode may comprise a voltage, in particular a forward voltage, between 0.1 V and 0.5 V, in particular between 0.2 V and 0.3 V. Preferably, the forward voltage is the voltage directed from the at least one antenna element to the at least one transducer. The diode may comprise said voltage, in particular said forward voltage, at body temperature, in particular at a temperature of 37° C. Said parameters of the diode, in particular of the rectifier diode, may allow an optimized diode to be chosen for bone anchored implant device.

The modulation device may comprise at least one capacitor switch circuit. The capacitor switch circuit may be controlled by at least one processing unit. The capacitor switch circuit may be arranged to control the value, in particular a capacity, of the capacitor switch circuit, in particular the capacity of the capacitor, depending on the power consumption of the bone anchored hearing device, the bandwidth of the signals, in particular of the demodulated signals and/or the total harmonic distortion of the bone anchored hearing implant device. Additionally, the skin thickness of the user of the bone anchored hearing device may be taken into account when controlling said value, in particular said capacity. Hereby, the bone anchored hearing device may be individualized with regard to the preferences of the user.

The bone anchored hearing implant device may further comprise at least one transducer, in particular for generating vibrations depending on the demodulated signals. The transducer may comprise a vibrator for providing a stimulus which is perceived by the user as an acoustic signal. Said stimulus may be provided by the vibrator as a mechanical vibration of a skull bone.

The bone anchored hearing implant device may further comprise at least one connection circuit for transferring the signals received by the antenna element to the at least one modulation device and for transferring the demodulated signals to the transducer. The at least one connection circuit in particular allows for the transportation of the audio and/or information signals between the at least one modulation device and the at least one transducer.

The bone anchored hearing implant device may further comprise at least one protection circuit for at least partly short-circuiting the connection circuit, wherein:

if the protection circuit is located between the at least one antenna element and the at least one modulation device, the short-circuit at least partly prevents a transfer of the signals received by the antenna element, wherein the protection circuit short-circuits the connection circuit if at least one certain threshold value indicative of a parameter of the signals received by the antenna element is exceeded, or if the protection circuit is located between the at least one modulation device and the at least one transducer, the short-circuit at least partly prevents a transfer of the demodulated signals to the transducer, wherein the protection circuit short-circuits the connection circuit if at least one certain threshold value indicative of a parameter of the demodulated signals is exceeded.

Hereby, the user of the bone anchored hearing implant device may reliably be protected from overstimulation.

Preferably, the at least one protection circuit is only activated if the demodulated signal exceeds a certain threshold value indicative of a parameter of the demodulated signal. The at least one connection circuit and/or the at least one protection circuit may be an integrated circuit.

The parameter can be a voltage or a current.

According to another aspect a hearing device system is provided, wherein the hearing device system comprises at least one aforementioned bone anchored hearing implant device, and at least one external hearing device for supplying the antenna element with signals.

According to yet another aspect, a signal processing method for protecting the user of a bone anchored hearing implant device from overstimulation is provided. The signal processing method may comprise: receiving signals from an external device, demodulating the received signals, transferring the received signals to a modulation device comprising a demodulation circuitry if a parameter, in particular a voltage, of the received signals is below or substantially equal to a certain threshold, and preventing the transfer of the received signals to the modulation device comprising a demodulation circuitry via a protection circuit only if the parameter, in particular the voltage, of the received signals exceeds the certain threshold, or transferring the demodulated signals to a transducer if a parameter, in particular a voltage, of the demodulated signals is below or substantially equal to a certain threshold, and preventing the transfer of the demodulated signals to the transducer via the protection circuit only if the parameter, in particular the voltage, of the demodulated signals exceeds the certain threshold.

The at least one antenna element may for example be part of an inductive module, wherein the inductive module may also comprise at least on tuning capacitor. The at least one antenna element may for example comprise at least one antenna coil. The at least one antenna element may be suited to receive and/or transmit signals with a frequency, in particular with a resonance frequency, in the range of 50 kHz to 10 GHz, in particular 60 kHz to 150 kHz. Designing the at least one antenna element for other suitable frequencies or frequency intervals is also possible. The signal received by the at least one antenna element may for example be in form of a sine wave.

The at least one modulation device may for example be an amplitude modulation device for amplitude demodulating the signals received by the at least one antenna element. The at least one modulation device may be based on a rectifier implementation comprising a demodulation circuitry. The demodulation circuitry may comprise at least one rectifier diode and at least one capacitor.

The at least one transducer may be controlled by current variations of the demodulated signals. If for example an alternating current is supplied to the transducer via the at least one demodulator, the transducer may vibrate depending on the frequency of the demodulated signal.

The bone anchored hearing implant device may comprise at least one protection circuit, wherein the parameter of the demodulated signal indicative of which the protection circuit short-circuits the connection circuit is a voltage, in particular a saturation voltage. The amplitude of the voltage of the demodulated signals may for example cause the transducer, in particular at least one vibrator of the transducer, to generate vibrations, wherein the output force of the created vibrations may correspond to the amplitude of the voltage of the demodulated signals. The amplitude of the voltage of the demodulated signals may be proportional to the output force of the transducer. Thus, if the voltage, in particular a saturation voltage, is used as a threshold value above which the connection circuit is short-circuited, the user of a bone anchored hearing implant device may be protected from overstimulation in a reliable manner.

The at least one protection circuit of the bone anchored hearing implant device may comprise at least one transistor, in particular at least one metal oxide semiconductor field effect transistor, wherein the transistor is activated when a voltage threshold is exceeded, and wherein an activation of the transistor at least partly prevents a transfer of the of the demodulated signals to the transducer or a transfer of the signals received by the antenna element to the modulation device. This allows for a reliable short-circuit of the connection circuit in order to prevent an excessive output force being produced by the at least one transducer. Preferably, the at least one transistor is a metal oxide semiconductor field effect (MOSFET) transistor. In particular, it is preferred that the metal oxide semiconductor field effect transistor is an n-channel metal oxide semiconductor field effect transistor, more preferably an n-channel enhancement mode metal oxide semiconductor field effect transistor. In an n-channel enhancement mode metal oxide semiconductor field effect transistor, a conductive channel does not exist naturally within the transistor and a positive voltage, in particular a positive voltage from a gate to a source of the transistor, is needed to create said conductive channel. Hereby, the transistor may be activated in a reliable manner if the voltage threshold is exceeded.

An activation of the transistor may cause a current in the connection circuit to be clamped, in particular by creating a short circuit, thereby at least partly preventing a transfer of the demodulated signals to the transducer or a transfer of the signals received by the antenna element to the modulation device. Hereby, at least a part of the current may be dissipated which prevents at least a part of the current from entering the at least one transducer, in particular the at least one vibrator of the at least one transducer. This allows for preventing the transducer from creating an excessive output force and thereby preventing the user of the bone anchored hearing implant device from overstimulation.

The at least one protection circuit may comprise at least one diode, in particular a Z-diode or a Zener diode, wherein the diode is used to activate the transistor. By using a diode, a threshold voltage above which the protection circuit at least partly short-circuits the connection circuit may be influenced in a constructively sufficient manner. Preferably, the diode is used to induce a current from a gate to a source of the transistor and thus creating a conductive channel from the source to the drain of the transistor. In particular, the diode is designed to only allow a current to flow when a certain set voltage, in particular a Zener voltage, is reached.

The at least one protective circuit of the bone anchored hearing implant device may comprise a metal oxide semiconductor field effect transistor comprising a source, a gate and a drain, wherein the diode is connected, in particular in series, to the gate and the drain and wherein the saturation voltage substantially is defined as a sum of the diode voltage and the voltage of the gate to the source of the metal oxide semiconductor field effect transistor. This allows for a reliable adjustment of the saturation voltage above which the protection circuit at least partly short-circuits the connection circuit. If a different saturation voltage is desired, a different diode, in particular a different Zener diode comprising a different Zener diode reference, may be chosen. Hereby, the saturation voltage may be adjusted by only changing the Zener diode reference. This allows for the occupation of a printed circuit board being the same independent of the desired saturation voltage and/or the desired maximum force output. Additionally, the saturation voltage and/or the maximum force output may be adjusted depending on the bone anchored hearing implant device, the transducer and/or the at least one vibrator of the transducer.

The at least one protection circuit of the bone anchored hearing implant device may comprise at least one resistor, wherein the resistor is in particular connected in series to the diode. This allows for the current flowing in the at least one diode to be limited. The resistor may for example have a resistance between 100 and 300 Ohm, in particular between 150 and 250 Ohm.

The at least one protection circuit of the bone anchored hearing implant device may comprise at least one capacitor, wherein the capacitor is in particular connected in parallel to the resistor. This allows for a stabilization of the voltage of the at least one diode, in particular of the at least one Zener diode voltage.

The capacitor may cause a delay of the protection circuit by applying a delay to the transistor, in particular a delay to the gate of the metal oxide semiconductor field effect transistor. Hereby, the value of the capacitor may determine a delay of the activation of the protection circuit by applying a delay to the transistor, in particular to the gate of the transistor. By providing a delay, it may be ensured that the protection circuit does not unwillingly influence the performance of the transducer. It may in particular be ensured that the protection circuit does not influence the performance of the transducer if the voltage is below the saturation voltage.

The delay may also be caused by the resistor and the capacitor.

The at least one external hearing device of the hearing device system may comprise at least one housing, at least one energy supply, at least one microphone and at least one sound processor for supplying the at least one antenna element with signals.

The protection circuit may be activated with a delay after the parameter, in particular the voltage, of the demodulated signals or the received signals exceeds a certain threshold. By providing a delay, it may be ensured that the protection circuit does not unwillingly influence the performance of the transducer. It may in particular be ensured that the protection circuit does not influence the performance of the transducer below the certain threshold value.

The protection circuit may be activated during the use of the implant device. In particular, the protection circuit may only be activated during the use of the implant device. Hereby, the protection circuit does not use battery power unnecessarily.

The certain threshold of the parameter, in particular of the voltage, of the demodulated signals or the received signals may be configurable by selecting a suitable diode for the protection circuit. This allows for a easy adjustment of the bone anchored hearing implant device depending on the used devices, for example on the used transducer, and/or depending on user preferences.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
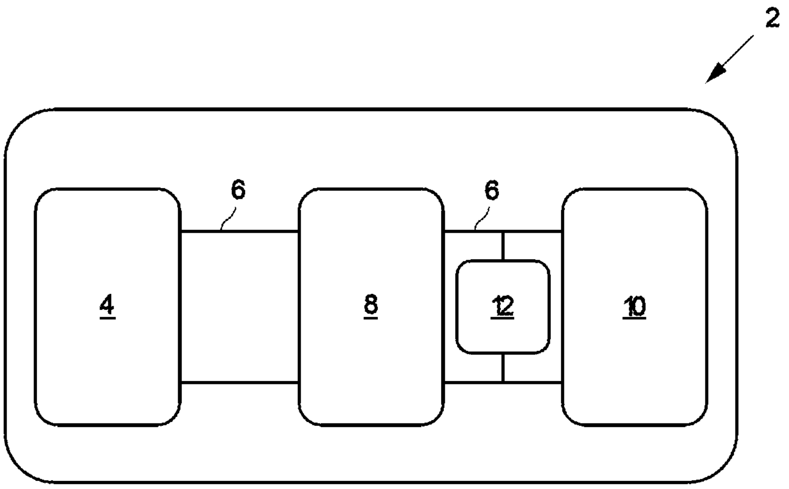
FIG. 1 shows a schematic diagram illustrating an overview of an exemplary embodiment of a bone anchored hearing implant device.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A bone anchored hearing implant device may be or include a hearing aid that is adapted to improve or augment the hearing capability of a user by receiving an acoustic signal from a user's surroundings, generating a corresponding audio signal, possibly modifying the audio signal and providing the possibly modified audio signal to at least one of the user's cochleae. 'Improving or augmenting the hearing capability of a user' may include compensating for an individual user's specific hearing loss. Such audible signals may be provided in the form of an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

A "hearing system" refers to a system comprising one or two hearing devices, and a "binaural hearing system" or a bimodal hearing system refers to a system comprising two hearing devices where the devices are adapted to cooperatively provide audible signals to both of the user's ears either by acoustic and mechanical stimulation, mechanical stimulation only, acoustic and electrical stimulation, mechanical and electrical stimulation or only electrical stimulation. The hearing system, the binaural hearing system or the bimodal hearing system may further include one or more auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device system includes an input unit such as a microphone for receiving an acoustic signal from a user's surroundings and providing a corresponding input audio signal to at least one antenna element for electronically receiving an input audio signal. The hearing device system, in particular the bone anchored hearing implant device further includes a signal processing unit for processing the input audio signal and an output unit for providing a signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal to the ear of the user, a mechanical stimulation applied transcutaneously or percutaneously to the skull bone, an electrical stimulation applied to auditory nerve fibers of a cochlea of the user. In some hearing devices, the output unit may include one or more output electrodes for providing the electrical stimulations such as in a Cochlear Implant, or the output unit may include one or more vibrators for providing the mechanical stimulation to the skull bone.

Now referring to FIG. 1, which shows a schematic diagram illustrating an overview of an exemplary embodiment of a bone anchored hearing implant device 2. The bone anchored hearing implant device 2 may enhance the hearing capability of a user. The bone anchored hearing implant device 2 comprises at least one antenna element 4 for receiving signals provided by an external hearing device. The antenna element 4 is electrically connected via a connection circuit 6 with at least one modulation device 8 for demodulating the signals receives by the at least one antenna element 4. The modulation device 8 may for example comprise at least one capacitor switch circuit 50. The modulating device 8 is connected also via the connection circuit 6 with a transducer 10, wherein the transducer 10 may generate vibrations depending on the demodulated signals received from the modulation device 8. The connection circuit 6 is also connected with a protection circuit 12 located between the modulation device 8 and the transducer 10, which may at least partly short-circuit the connection circuit 6 and thus at least partly prevent a transfer of the demodulated signals to the transducer 10.

The protection circuit 12 can also be located between the antenna element 4 and the modulation device 8. In this implementation, the protection circuit 12 may at least partly short-circuit the connection circuit 6 and thus at least partly prevent a transfer of the received signals to the modulation device 8 (and therefore at least partly prevent a transfer of demodulated signals to the transducer 10).

Figure 2:
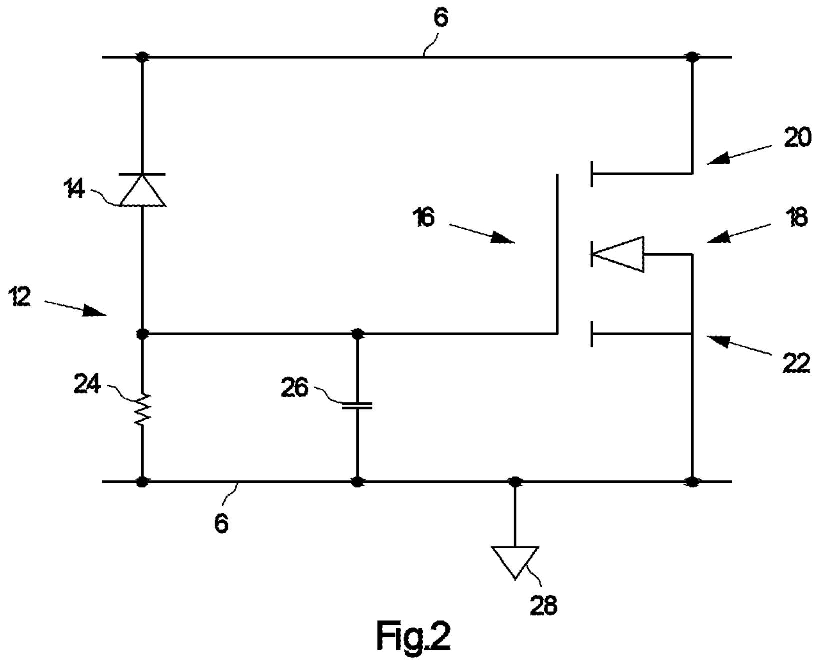
FIG. 2 shows a schematic view of an exemplary embodiment of a protection circuit.

FIG. 2 shows a schematic view of an exemplary embodiment of said protection circuit 12. The protection circuit 12 comprises a Zener diode 14 which is connected to the gate 16 and the drain 20 of an n-channel metal oxide semiconductor field effect (MOSFET) transistor 18, which further comprises a source 22.

Further, the Zener diode 14 is connected in series with a resistor 24 and a capacitor 26 is arranged in parallel to the resistor 26. The resistor 24 and the capacitor 26 are connected to the gate 16 and the source 22 of the MOSFET transistor 18. The resistor 24 may allow the current flowing in the diode 14 to be limited. The capacitor 26 may cause a delay of the protection circuit by applying a delay to the MOSFET transistor 18. The protection circuit 12 may further comprise an electrical bonding 28.

If the voltage of the current in the connection circuit 6 is below the sum of the Zener diode voltage and the gate 16 to source 22 voltage of the MOSFET transistor 18, the MOSFET transistor 18 is deactivated. Therefore, no conductive channel from drain 20 to source 22 exists in the MOSFET transistor 18 if the voltage in the connection circuit 6 is below said sum of voltages.

If the voltage of the current in the connection circuit 6 is above the sum of the Zener diode voltage and the gate 16 to source 22 voltage of the MOSFET transistor 18, the MOSFET transistor 18 is activated. Therefore, a conductive channel from drain 20 to source 22 exists in the MOSFET transistor 18 if the voltage in the connection circuit 6 is above said sum of voltages.

When the MOSFET transistor 18 is active, the current in the connection circuit 6 is clamped, i.e. a short circuit is created in such a way that the current does not enter the transducer 10. Hereby, the performance of the transducer 10 is substantially only impacted if the voltage threshold is exceeded.

Figure 3:
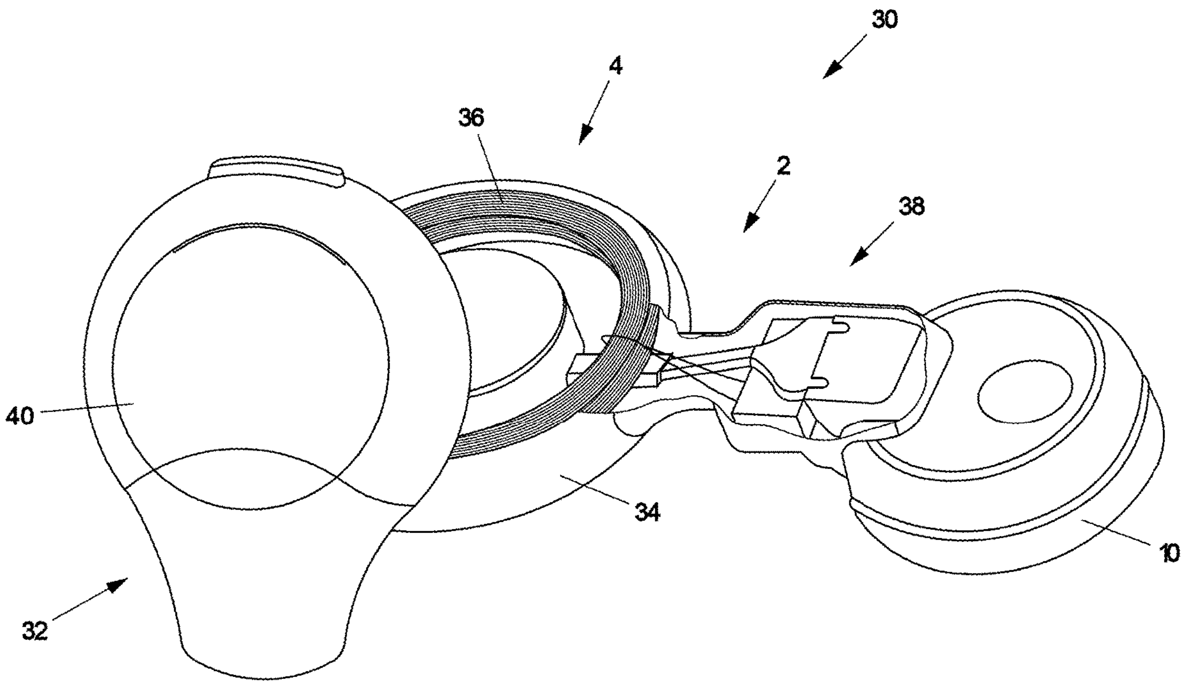
FIG. 3 shows a schematic illustration of an embodiment of a hearing device system in a perspective view.

FIG. 3 shows a schematic illustration of an embodiment of a hearing device system 30 in a perspective view. The hearing device system 30 comprises one bone anchored hearing implant device 2 and one external hearing device 32. The bone anchored hearing implant device 2 comprises a housing 34. The at least one antenna element 4 comprises an antenna coil 36. A middle part 38 of the bone anchored hearing implant device 2 comprises the connection circuit 6 and the protection circuit 12. The external hearing device 32 in particular comprises a housing 40 and a sound processor (not shown) for providing the antenna element 4 with signals.

Figure 4:
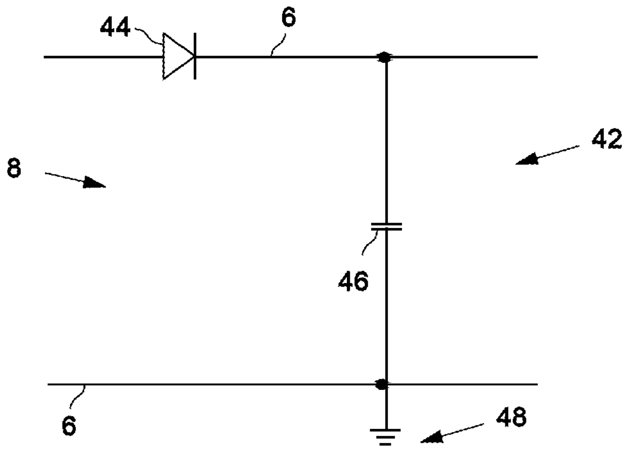
FIG. 4 shows a schematic view of a first exemplary embodiment of a modulation device.

FIG. 4 shows a schematic view of a first exemplary embodiment of said modulation device 8. The modulation device 8 comprises a demodulation circuitry 42, wherein the demodulation circuitry 42 may demodulate the signals received by and/or delivered by the at least one antenna element 4. The demodulation circuitry further comprises a diode 44, in particular a rectifier diode, and a demodulation capacitor 46. The diode 44 and the demodulation capacitor 46 may be connected with the connection circuit 6, in particular coupled to the load. The value, in particular the capacity, of the demodulation capacitor 46 influences the power consumption of the bone anchored hearing implant device 2, the bandwidth of the signals, in particular of the demodulated signals and/or the total harmonic distortion of the bone anchored hearing implant device 2. Preferably, the capacity of the demodulation capacitor 46 is determined taking into account the parameters specified above and also the skin thickness measure of a user. The capacity of the demodulation capacitor 46 may for example be between 45 nF and 50 nF. The modulation device 8 may further comprise a ground 48.

Figure 5:
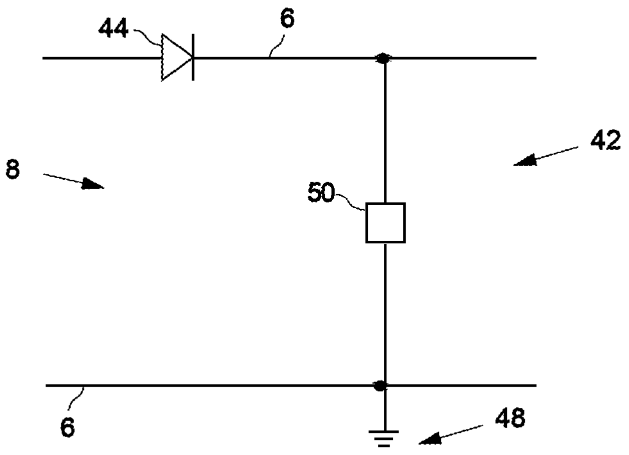
FIG. 5 shows a schematic view of a second exemplary embodiment of a modulation device.

The second exemplary embodiment of a modulation device 8 shown in FIG. 5 mainly corresponds to the modulation device 8 depicted in FIG. 4. Instead of the demodulation capacitor 46, a capacitor switch circuit 50 is arranged. The capacitor switch circuit 50 may in particular comprise a demodulation capacitor 46 and a processing unit. Said processing unit may be configured to control the capacity of the demodulation capacitor 46 depending on the power consumption of the bone anchored hearing device, the bandwidth of the signals, in particular of the demodulated signals, the total harmonic distortion of the bone anchored hearing implant device, the skin thickness of a user and/or the personal preferences of a user. This allows for an individualization of the bone anchored hearing implant device.

A Computer Program:

A computer program product comprising instructions which, when the program is executed by a computer, cause the computer to carry out steps of the method described above, in the 'detailed description of embodiments' and in the claims is furthermore provided by the present application.

A Computer Readable Medium

In an aspect, the functions may be stored on or encoded as one or more instructions or code on a tangible computer-readable medium. The computer readable medium includes computer storage media adapted to store a computer program comprising program codes, which when run on a processing system causes the data processing system to perform at least some (such as a majority or all) of the steps of the method described above, in the and in the claims.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium. </mention relevant parts of the method that may be implemented in software; if not all/>

A Data Processing System

In an aspect, a data processing system for preferably performing a signal processing method comprises a processor adapted to execute the computer program for causing the processor to perform at least some (such as a majority or all) of the steps of the method described above and in the claims. In particular, the processor is adapter for receiving signals from an external device, demodulating the received signals, transferring the received signals to a modulation device comprising a demodulation circuitry if a parameter, in particular a voltage, of the received signals is below or substantially equal to a certain threshold, and preventing the transfer of the received signals to the modulation device comprising a demodulation circuitry via a protection circuit only if the parameter, in particular the voltage, of the received signals exceeds the certain threshold, or transferring the demodulated signals to a transducer if a parameter, in particular a voltage, of the demodulated signals is below or substantially equal to a certain threshold, and preventing the transfer of the demodulated signals to the transducer via the protection circuit only if the parameter, in particular the voltage, of the demodulated signals exceeds the certain threshold.

It is intended that the structural features of the devices described above, either in the detailed description and/or in the claims, may be combined with steps of the method, when appropriately substituted by a corresponding process.

As used, the singular forms “a,” “an,” and “the” are intended to include the plural forms as well (i.e. to have the meaning “at least one”), unless expressly stated otherwise. It will be further understood that the terms “includes,” “comprises,” “including,” and/or “comprising,” when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being “connected” or “coupled” to another element, it can be directly connected or coupled to the other element, but an intervening element may also be present, unless expressly stated otherwise. Furthermore, “connected” or “coupled” as used herein may include wirelessly connected or coupled. As used herein, the term “and/or” includes any and all combinations of one or more of the associated listed items. The steps of any disclosed method are not limited to the exact order stated herein, unless expressly stated otherwise.

It should be appreciated that reference throughout this specification to “one embodiment” or “an embodiment” or “an aspect” or features included as “may” means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean “one and only one” unless specifically so stated, but rather “one or more.” Unless specifically stated otherwise, the term “some” refers to one or more.

Accordingly, the scope should be judged in terms of the claims that follow.

The invention claimed is:

1. Bone anchored hearing implant device for enhancing the hearing capability of a user comprising:

at least one antenna element for receiving signals provided by an external device, in particular by at least one external hearing device, at least one modulation device comprising a demodulation circuitry for demodulating the signals received by the antenna element, at least one transducer, in particular for generating vibrations depending on the demodulated signals, at least one connection circuit for transferring the signals received by the antenna element to the at least one modulation device and for transferring the demodulated signals to the transducer, at least one protection circuit for at least partly short-circuiting the connection circuit, wherein:

the short-circuit at least partly prevents a transfer of the demodulated signals to the transducer if a certain threshold value indicative of a parameter of the demodulated signals is exceeded, or the short-circuit at least partly prevents a transfer of the signals received by the antenna element to the modulation device if a certain threshold value indicative of a parameter of the signals received by the antenna element is exceeded.

2. Bone anchored hearing implant device according to claim 1, wherein, the parameter of the demodulated signal indicative of which the protection circuit short-circuits the connection circuit is a voltage, in particular a saturation voltage.

3. Bone anchored hearing implant device according to claim 2, wherein, the transistor is a metal oxide semiconductor field effect transistor comprising a source, a gate and a drain, wherein the diode is connected, in particular in series, to the gate and the drain, and wherein the saturation voltage substantially is defined as a sum of the diode voltage and the voltage of the gate to the source of the metal oxide semiconductor field effect transistor.

4. Bone anchored hearing implant device according to claim 3, wherein, the protection circuit comprises at least one resistor, wherein the resistor is in particular connected in series to the diode.

5. Bone anchored hearing implant device according to claim 3, wherein, the protection circuit comprises at least one capacitor, wherein the capacitor is in particular connected in parallel to the resistor.

6. Bone anchored hearing implant device according to claim 2, wherein, the protection circuit comprises at least one transistor, in particular at least one metal oxide semiconductor field effect transistor, wherein the transistor is activated when a voltage threshold is exceeded, and wherein an activation of the transistor at least partly prevents a transfer of the of the demodulated signals to the transducer or a transfer of the signals received by the antenna element to the modulation device.

7. Bone anchored hearing implant device according to claim 1, wherein, the protection circuit comprises at least one transistor, in particular at least one metal oxide semiconductor field effect transistor, wherein the transistor is activated when a voltage threshold is exceeded, and wherein an activation of the transistor at least partly prevents a transfer of the of the demodulated signals to the transducer or a transfer of the signals received by the antenna element to the modulation device.

8. Bone anchored hearing implant device according to claim 7, wherein, the protection circuit comprises at least one diode, in particular a Z-diode or a Zener diode, wherein the diode is used to activate the transistor.

9. Bone anchored hearing implant device according to claim 8, wherein, the protection circuit comprises at least one resistor, wherein the resistor is in particular connected in series to the diode.

10. Bone anchored hearing implant device according to claim 9, wherein, the protection circuit comprises at least one capacitor, wherein the capacitor is in particular connected in parallel to the resistor.

11. Bone anchored hearing implant device according to claim 8, wherein, the transistor is a metal oxide semiconductor field effect transistor comprising a source, a gate and a drain, wherein the diode is connected, in particular in series, to the gate and the drain, and wherein the saturation voltage substantially is defined as a sum of the diode voltage and the voltage of the gate to the source of the metal oxide semiconductor field effect transistor.

12. Bone anchored hearing implant device according to claim 8, wherein, the protection circuit comprises at least one capacitor, wherein the capacitor is in particular connected in parallel to the resistor.

13. Bone anchored hearing implant device according to claim 7, wherein, the protection circuit comprises at least one capacitor, wherein the capacitor is in particular connected in parallel to the resistor.

14. Bone anchored hearing implant device according to claim 13, wherein, the capacitor causes a delay of the protection circuit by applying a delay to the transistor, in particular a delay to the gate of the metal oxide semiconductor field effect transistor.

15. Hearing device system comprising, at least one bone anchored hearing implant device according to claim 1, and at least one external hearing device for supplying the antenna element with signals.

16. Hearing device system according to claim 15, wherein, the at least one external hearing device comprises at least one housing, at least one energy supply, at least one microphone and at least one sound processor for supplying the antenna element with signals.

17. Signal processing method for protecting the user of a bone anchored hearing implant device from overstimulation, the method comprising:

Receiving signals from an external device,

Demodulating the received signals,

Transferring the received signals to a modulation device comprising a demodulation circuitry if a parameter, in particular a voltage, of the received signals is below or substantially equal to a certain threshold, and preventing the transfer of the received signals to the modulation device comprising a demodulation circuitry via a protection circuit only if the parameter, in particular the voltage, of the received signals exceeds the certain threshold, or Transferring the demodulated signals to a transducer if a parameter, in particular a voltage, of the demodulated signals is below or substantially equal to a certain threshold, and preventing the transfer of the demodulated signals to the transducer via the protection circuit only if the parameter, in particular the voltage, of the demodulated signals exceeds the certain threshold.

18. Signal processing method according to claim 17, wherein, the protection circuit is activated with a delay after the parameter, in particular the voltage, of the demodulated signals or the received signals exceeds a certain threshold.

19. Signal processing method according to claim 17, wherein, the protection circuit is activated during the use of the bone anchored hearing implant device.

20. Signal processing method according to claim 17, wherein, the certain threshold of the parameter, in particular of the voltage, of the demodulated signals or the received signals is configurable by selecting a suitable diode for the protection circuit.

* * * * *